United States Patent [19]
Jacquemin et al.

[11] Patent Number: 6,101,492
[45] Date of Patent: Aug. 8, 2000

[54] METHODS AND APPARATUS FOR INFORMATION INDEXING AND RETRIEVAL AS WELL AS QUERY EXPANSION USING MORPHO-SYNTACTIC ANALYSIS

[75] Inventors: Christian Jacquemin, Poitiers, France; Evelyne Tzoukermann, Hastings On Hudson, N.Y.

[73] Assignee: Lucent Technologies Inc., Murray Hill, N.J.

[21] Appl. No.: 09/109,506

[22] Filed: Jul. 2, 1998

[51] Int. Cl.[7] .................................................. G06F 17/30
[52] U.S. Cl. ............................ 707/3; 707/5; 704/1; 704/4
[58] Field of Search ................................ 707/3, 5; 704/1, 704/4; 706/46, 47, 11; 716/6

[56] References Cited

U.S. PATENT DOCUMENTS

| | | | |
|---|---|---|---|
| 4,965,763 | 10/1990 | Zamora | 704/1 |
| 5,282,265 | 1/1994 | Rohra Suda et al. | 706/11 |
| 5,555,408 | 9/1996 | Fujisawa et al. | 707/5 |
| 5,623,609 | 4/1997 | Kaye et al. | 704/1 |
| 5,957,520 | 9/1999 | Suda et al. | 717/6 |

*Primary Examiner*—Thomas G. Black
*Assistant Examiner*—Diane D. Mizrahi
*Attorney, Agent, or Firm*—Law Offices of Peter H. Priest

[57] ABSTRACT

An index generator and query expander for use in information retrieval in a corpus. A corpus is provided as an input to an inflectional analyzer, which produces a lemmatized corpus having base forms and associated inflections for each word in the original corpus. The lemmatized corpus is provided as an input to a disambiguator, which performs part of speech tagging and morpho-syntactic disambiguation to produce a disambiguated corpus. The disambiguated corpus is provided as an input to a derivational generator, which produces an expanded corpus having all possible valid derivatives of each word of the disambiguated corpus. The disambiguated corpus is provided as an input to a transformational analyzer, using a grammar and a metagrammar for analyzing syntactic and morphosyntactic variations to conflate and generate variants, producing an index to the corpus having a minimum of variants. Alternatively, a query expander is provided utilizing similar techniques.

38 Claims, 9 Drawing Sheets

METHODS AND APPARATUS FOR INFORMATION INDEXING AND RETRIEVAL AS WELL AS QUERY EXPANSION USING MORPHO-SYNTACTIC ANALYSIS

FIELD OF THE INVENTION

The present invention relates generally to improvements to information retrieval systems. More particularly, the invention relates to techniques for reducing index searches by conflating multi-word term variants or expanding a search term in information retrieval systems.

BACKGROUND OF THE INVENTION

Information retrieval and query expansion systems are becoming more and more important and ubiquitous. The demands on such systems are growing steadily greater. A search corpus may contain millions of words which may be spread over hundreds of thousands of documents. An index suitable for efficient retrieval of information from such a corpus may contain thousands of search terms.

Indices may be produced through free indexing, where terms are automatically extracted from corpora without referring to a controlled list. Alternatively, controlled indexing may be employed using available terminological data and other resources, such as thesauri, ontologies, or keyword lists. The quality of the input index list affects the quality of the results. It is known that many free indexing techniques suffer from overgeneration, even though syntactic and semantic filters are applied. The concomitant disadvantage of using a controlled index list is that it must be manually produced, a time-consuming and expensive task.

Indices of single-word search terms are useful for corpora of a relatively small size, but single-word search terms become inadequate as corpora become larger. Single-word search terms can be quite ambiguous and are unable both to completely cover and to accurately define a large corpus. Moreover, concept-based searching is becoming more and more popular, and many concepts for which a user might like to search are difficult or impossible to define using single-word terms.

As corpora to be searched grow, the use of multi-word search terms becomes more useful and more important. A single-word search term may not sufficiently limit the field of search, with the result that a search may retrieve too many results. Moreover, as the size of corpora increase, single-word terms appear in more and more unrelated portions of a corpus, so that a single-word search is likely to retrieve numerous results having nothing to do with the desired topic.

The use of multi-word search terms leads to greater precision in searching. Through the use of multi-word searches, it is possible to restrict the number of results retrieved by a search and to increase the likelihood that the results retrieved will be relevant to the search topic being sought. However, because of the different permutations in which multi-word search terms can occur, indices consisting of multi-word terms can become quite large. Moreover, because the same meaning or concept can be expressed through numerous different combinations of words, an index may contain numerous variants of multi-word terms.

In order to increase the accuracy of an index of multi-word terms and to decrease the work involved in searching the index, it is advantageous to reduce the number of multi-word term variants and join all the multi-word variants under a single index. That is, the number of multi-word search terms which have the same meaning. As the size of databases continues to increase, the need to reduce the size of indices increases. In conflating term variants under the same index, a system can be built more efficiently, since the term remaining after reduction is able to retrieve all documents which could be retrieved by the original terms.

In conflation, a reference term is called the 'original term.' It is convenient to consider variants as belonging to one of two types. A type 1 variant results from the inflection of individual words and from modification of the syntactic structure of the original term. For example, 'diseases of the lower urinary tract' is a type 1 variant of 'urinary tract disease.'

A type 2 variant differs from a type 1 variant under the following condition: at least one of the content words of the original term is not found inflected in the variant, but is transformed into another word derived from the same morphological stem. Thus, 'translational or transcriptional inhibition' is a type 2 variant of 'translation inhibitor' which is not a type 1 variant because both content words of the original term have undergone derivational morphologic changes.

A more precise definition is as follows:

A type 1 or type 2 variant of a multiword term is a textual utterance such that:

each content word of the original term (type 1) or another word deriving from the same morphologic stem (type 2) is found in the variant, and the variant can be substituted for the original term in a task of information access.

Since variants can be substituted for the original term, it is useful to be able to conflate variants so as to reduce the number of variants (all of which can be substituted for the original term) which must be dealt with.

Several techniques for reducing terms exist in the prior art. In the prior art, the main trend for the conflation of multi-word terms in information retrieval relies on a combination of three non-linguistic methods: empty word deletion, stemming, and grouping of single words into multi-word phrases based on concurrence information. Due to their lack of linguistic knowledge, stemming and lexical lookup conflate occurrences without conceptual relation.

Stemming reduces words to a stem, which is thought to be identical for all the words linguistically and often conceptually related. For example, 'magnesia', 'magnesium', 'magnet', 'magnetic', etc., can be conflated by a stemming algorithm and reduced to the common stem 'magnes', thus grouping together words of different meanings.

In a medical thesaurus, lexical lookup conflates 'liver' and 'hepatic' or 'renal' and 'kidney'.

Prior-art linguistic techniques for reducing multi-word term variants have focused on syntactic transformations. A technique has been developed and implemented for the simplification of syntactic variants in English. Prior-art techniques for morphological analysis have been mainly applied to natural language processing tasks. These techniques focus mainly on inflectional morphology, or derivational morphology for semantic ambiguities. Some studies on automatic analysis of derivational morphology have also been performed. There also exists work on automatic analysis of inflectional morphology and part of speech tagging through the combination of linguistic and statistical knowledge.

In the prior art, morphology has been applied only to single word terms, or has been used in natural language processing applications not involving information retrieval. Conflation of multi-word terms has typically been performed using noisy and inaccurate methods, or has focused on syntactic variants.

In order to conflate multiword terms, two steps must be taken. First, the morphological variants of single words composing terms must be conflated. Second, the whole utterances of multiword term variants must be related to the original terms.

There are several methods for conflating single word terms. The coarsest and easiest one is truncation, a nonlinguistic method. Truncation removes the endings of the words (generally a fixed length of n characters). A more precise method is morphological analysis, which is knowledge-expensive. It parses a word and produces a constituent structure whose leaves are the stem and the affixes. Intermediate in complexity between truncation and morphological analysis is stemming, which removes endings according to a reference list and may change the resulting strings with recoding functions. The recoding functions are in charge of accounting for allomorphic alternations between the different derivatives within a derivational family. For example, a recoding function may transform a final 'rpt' into 'rb' in order to conflate absorption and absorb. The string resulting from a stemming procedure is called a stem. It is not necessarily equal to the linguistic root, but will serve as a minimal and hopefully unambiguous denotation of the term.

The two main errors that can occur while stemming are understemming and overstemming. Overstemming is the reduction of words having similar portions but differing meanings: for example, 'century' and 'center' to 'cent'. Understemming is reduction of words to different stems, when the reduction should be to the same stem: for example, 'acquiring' to 'acquir' and 'acquisition' to 'acquis'. Correct linguistic stemming is not necessarily semantically relevant and, furthermore, semantically correct stemming may be useless or even detrimental to information retrieval. Stemming must therefore be evaluated with respect to the task of information access. The constitution of derivational links is connected to the issue of word sense disambiguation.

Various approaches to stemming have been undertaken and evaluated. For the task of information retrieval, the use of a rich morphological stemmer enhances recall but degrades precision when compared with a minimal 's' removal stemmer.

There exists, therefore, a need in the art for techniques which combine morphological analysis and syntactic parsing to detect and conflate morphosyntactic variants through accurate and efficient methods.

SUMMARY OF THE INVENTION

An index generating system according to an aspect of the present invention combines morphological and syntactic analysis to produce an index from a corpus, term variants in the index being conflated to achieve an index with a minimum of term variants. A corpus is provided to an inflectional analyzer which uses morphological analysis to produce a lemmatized corpus containing all possible lemmatizations of the original corpus. A lemma is a glossary entry and associated definitions. The lemmatized corpus containing all possible lemmatizations thus includes each word of the original corpus, associated with all possible inflected base forms with which the word could conceivably be identified. The lemmatized corpus is provided to a disambiguator which employs syntactic analysis to perform part of speech disambiguation on the words of the lemmatized corpus to produce a disambiguated corpus. The disambiguated corpus is provided to a derivational analyzer which produces an expanded corpus containing all possible derivatives of the disambiguated corpus. Finally, the expanded corpus is provided to a transformational analyzer which conflates term variants using a grammar and a metagrammar. The grammar comprises a list of term rules, each of which represents the syntactic structure of a term. The metagrammar comprises a list of metarules. Each metarule describes a class of term variations for terms with a specific structure. The metagrammar is used for transforming the complex terms of the corpus through morphosyntactic transformations including all the content words of the original term or one of their derivatives. The transformational analyzer produces an index of multiword terms with a minimum of variants, representing the original corpus.

It will be recognized that the present techniques for generating morphosyntactic variance may also be readily applied to query extension as addressed further below.

A more complete understanding of the present invention, as well as further features and advantages of the invention, will be apparent from the following Detailed Description and the accompanying drawings.

DETAILED DESCRIPTION

Figure 1:
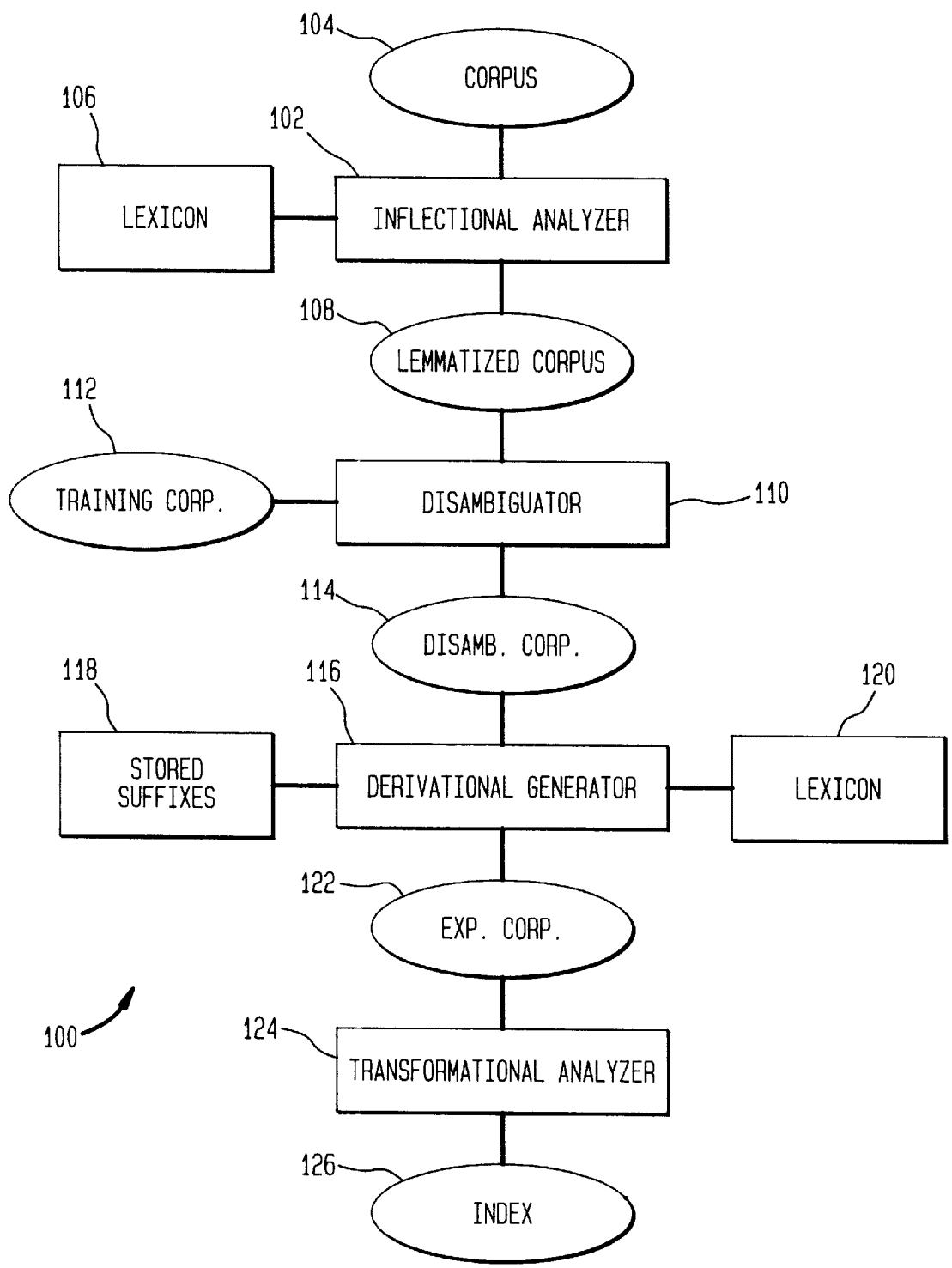
FIG. 1 illustrates an index generator according to the present invention.

FIG. 1 illustrates an index generator 100 according to the present invention. The index generator 100 uses morphosyntactic analysis to create a multi-word index, analyzing the corpus using morphological and syntactic knowledge to create and expand the index, and using the morphological and syntactic knowledge to conflate variant multiword terms in accordance with the teachings of the present invention.

The index generator 100 includes an inflectional analyzer 102. A corpus 104 is provided as an input to the inflectional analyzer 102. The output of the inflectional analyzer 102 is a lemmatized corpus 108 containing stems and inflectional features. lemmatizations.

A lemmatized corpus 108 is provided as an input to a part of speech disambiguator 110. The part of speech disambiguator 110 produces as an output a disambiguated corpus 112, the disambiguated corpus 112 having a disambiguated lemmatization. The disambiguated corpus 114 is provided as an input to a derivational generator 116, which also draws data from stored productive suffixes 118 and a stored lexicon of lemmas and derivational suffixes 120. The derivational generator 116 generates all the derivations of each disambiguated lemma, and produces as an output an expanded corpus 122 having derivational links.

After part of disambiguation and generation of morphological derived forms have been performed as described above, the expanded corpus 122 is provided to a transformational analyzer 124 to extract occurrences of terms and variants. Two main sources of knowledge are used: a large list of multiword terms (the grammar) and a set of syntactic transformations of terms into variants (the metagrammar). While the term base can be very large (several hundred thousand terms), the transformational metagrammar is small (less than one hundred rules). The list of multiword terms is recycled automatically into the computational grammar while the metagrammar is tuned empirically through large-scale experiments and a manual scanning of the results. The metagrammar takes as input term rules and transforms them into term variant rules through unification. The dynamically transformed rules are used by the parser to retrieve occurrences of term variants from a corpus with unambiguous part of speech categories and enhanced by derived forms and links. The parser also draws data from a stored list of productive variations 126 and a stored term list of multiword terms 128. The transformational analyzer 124 produces a corpus 130 consisting of all possible variants corresponding to multiword terms, as the variants have been conflated during the process of building the corpus 130. The corpus 130 can be used in two different ways. First, it can be used for indexing. In this case, the corpus 130 is represented by an index entry for which the variants have been conflated during the process of building the indexed corpus 130. Secondly, corpus 130 can be used for query expansion where a query term is expanded by generating corpus 130 and then all variants in the corpus 130 are utilized to search.

Figure 2:
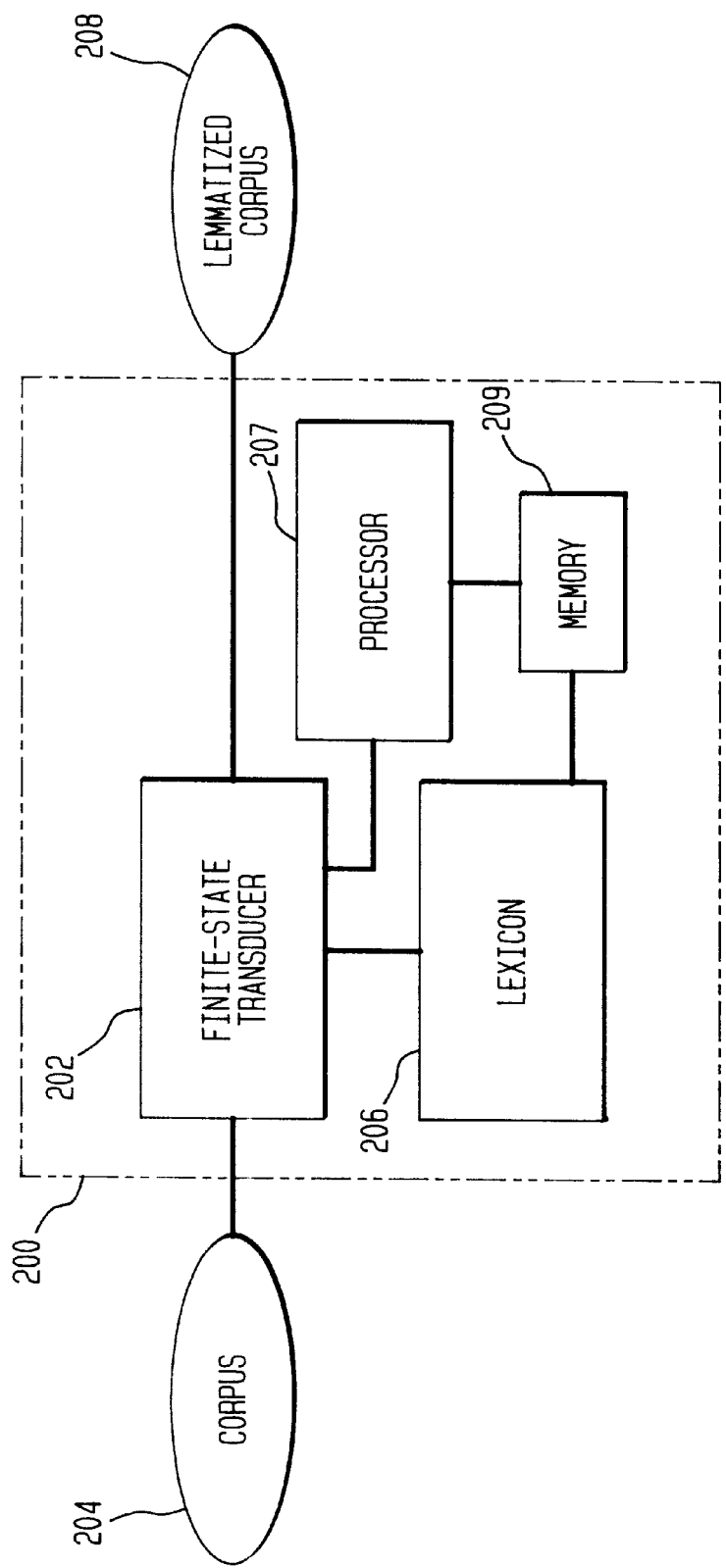
FIG. 2 illustrates an inflectional analyzer according to the present invention.

FIG. 2 illustrates an inflectional analyzer 200 according to the present invention. The inflectional analyzer 200 includes a finite-state morphological transducer 202. A finite-state transducer is a 7-tuple $(Q, \Sigma, Y, \delta, q_0, F, v)$, where: Q is a set of states, $\Sigma$ is a finite input alphabet, Y is a finite output alphabet, $q_0$ is the initial state where $q_0 \epsilon Q$, $\delta$ is the transition function $Q \times \Sigma \rightarrow Q$, and v is the output function $Q \times \Sigma \rightarrow Y$.

The finite state transducer 202 receives inputs from a corpus 204. Each entry of the corpus 204 is provided to the transducer as a string representing a unit to be analyzed, each string consisting of the word base form, along with features, and inflectional and derivational affixes. The transducer 202 also includes a lexicon 206 containing all possible transitions between base and inflected (that is, conjugated or declined) forms. The inflectional analyzer 200 includes a processor 207 for performing processing required, and also includes memory 209. The memory 209 may be used to store the lexicon 206, or other data required by the transducer 202 and processor 207. Using the information in the lexicon 206, the transducer 202 identifies an inflected state of each word in the corpus 204. That is, for each word in the corpus 204, the transducer 202 identifies all possible inflected base forms which could be represented by that word. Each of an inflected base forms is identified with the corpus word and this process is called lemmatization. The output of the inflectional analyzer 200 is a lemmatized corpus 208 containing stems and inflectional features. The lemmatized corpus is the original corpus having each word associated with all possible inflected base forms with which the word could conceivably be identified. A lemmatized corpus 208 may be stored in the memory 209 to be passed to other elements of the index generator as required.

The inflectional analyzer 200 typically produces multiple analyses of many of the words of a corpus, resulting in a need for disambiguation in order to enable further processing.

Figure 3:
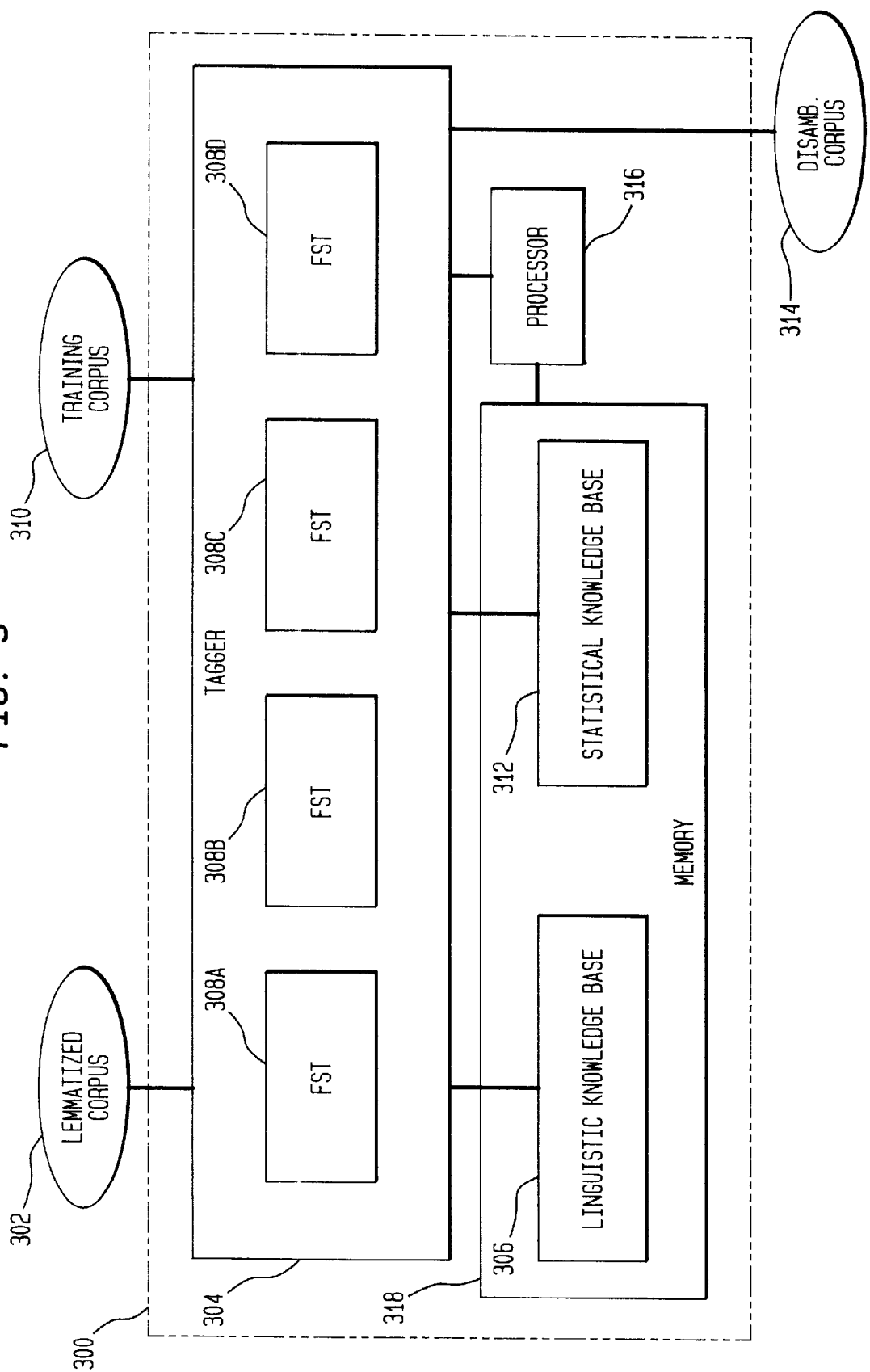
FIG. 3 illustrates a disambiguator according to the present invention.

FIG. 3 illustrates a morphosyntactic disambiguator 300 according to an aspect of the present invention. The morphosyntactic disambiguator 300 uses syntax and linguistic knowledge to disambiguate words in the corpus which have identical morphological analyses. The disambiguator 300 receives as an input a lemmatized corpus 302. The disambiguator 300 comprises a part-of-speech tagger 304, which tags each word in the lemmatized corpus 302 with a tag indicating its part of speech. The tagger 304 also receives input from a linguistic knowledge base 306 to apply linguistic knowledge to the words of the corpus in order to determine the correct tag. This linguistic information is written in a system of negative constraints or negative rules. The tagger 304 then uses this linguistic knowledge to restrict identification of a particular part of speech to words that meet the criteria for that part of speech. Speech tagger 304 may suitably consist of a set of finite-state transducers 308A–308D and uses a combination of linguistic knowledge and statistical learning to disambiguate words in the sentence context. The disambiguator 300 preferably employs statistical knowledge for disambiguation. Statistical knowledge gathered automatically through the manual tagging of a training corpus 310. At the training level, words of the training corpus 310 are gathered into classes corresponding to their morphological tags called genotype, and the statistical knowledge is stored from this process in a statistical knowledge base 312. The part of speech tagger is then able to employ the knowledge stored in the statistical knowledge base 312 in addition to the linguistic knowledge base 306 to determine the part of speech tag to apply. The use of a statistical knowledge base 312 adds to the accuracy of the tagger 304. The disambiguator 300 produces as its output a disambiguated corpus 314. The disambiguator 300 may include a processor 316 and memory 318. The memory 318 may be used for storing the linguistic knowledge base 306 and the statistical knowledge base 312. The processor 316 may be used by the part of speech tagger 304 in disambiguating words of a lemmatized corpus 302, and may also be used to implement statistical analysis of the training corpus 310. The memory 318 may also be used for storage of a lemmatized corpus 302, as well as for storage of the disambiguated corpus 314 for passage to subsequent elements of the index generator.

Once the words of the corpus are disambiguated, the corpus is in a state to be enriched with word derivatives. In the context of multiword term conflation in information retrieval, controlling the word productivity at this stage is not an issue, as excessive variants will be removed. What is important is to generate as many forms as possible so that the variants created on the input expressions can be properly enriched to provide some morphological alternatives.

Figure 4:
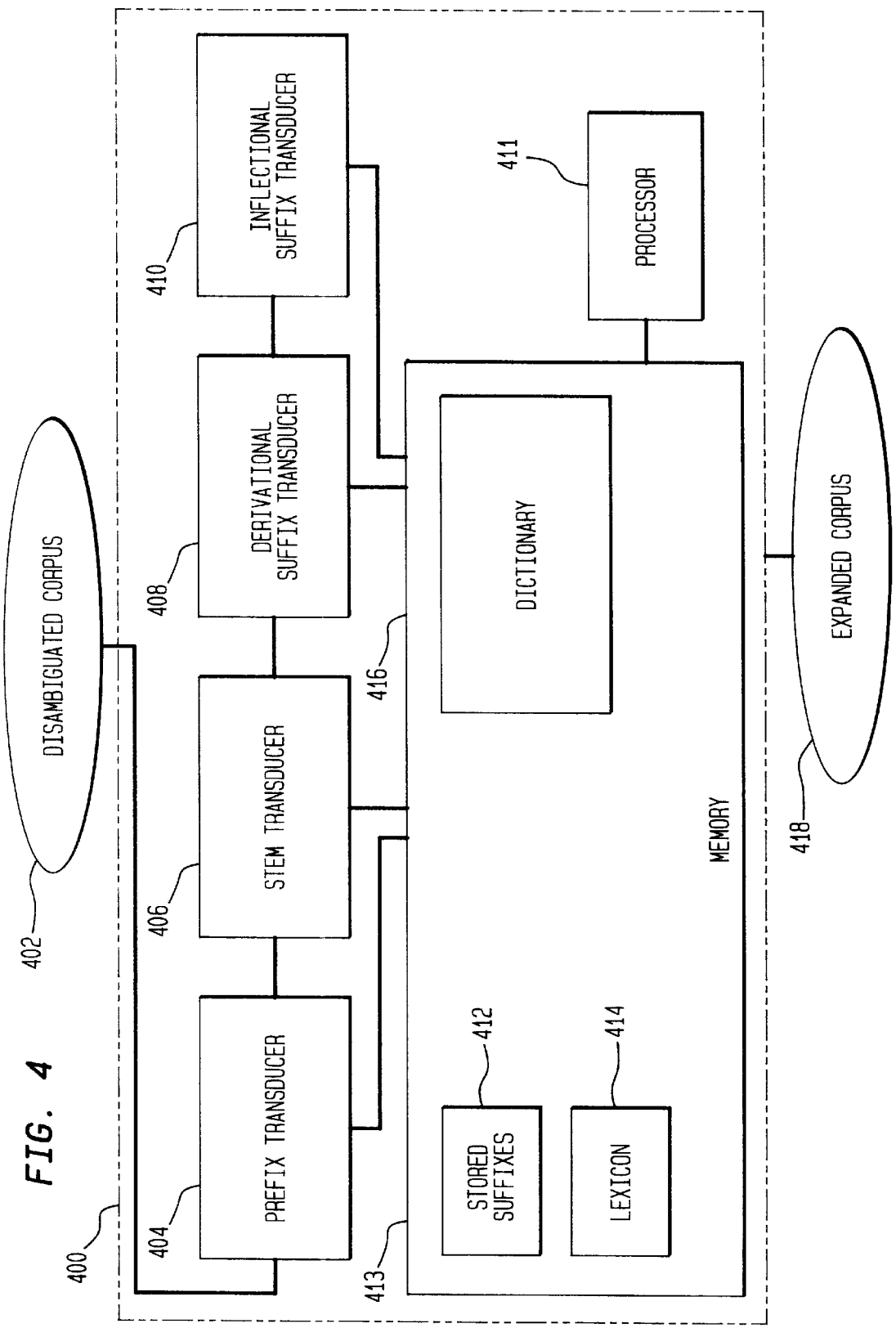
FIG. 4 illustrates a derivational analyzer according to the present invention.

FIG. 4 illustrates a derivational generator 400. Derivational transformations occur with the application of allomorphic, phonological, and morphological rules, and serve to create a maximum term list for inflation. The derivational generator 400 expands the disambiguated corpus 402 produced by the disambiguator 300 to associate each lemma with a list of morphologically related lexical entries from the dictionary.

The derivational generator 400 includes first, second, third and fourth transducers 404, 406, 408 and 410 operating sequentially to perform the generation of derivationally related words. The derivational generator 400 also includes a processor 411 for use by the transducers 404, 406, 408 and 410. First transducer 404 is a prefix transducer, second transducer 406 is a stem transducer, third transducer 408 is a derivational suffix transducer, and fourth transducer 410 is an inflectional suffix transducer. The disambiguated corpus 402 is introduced to the derivational generator 400, which then generates acceptable derivatives for each word of the corpus using the transducers 404, 406, 408 and 410. The derivational generator 400 also includes a database of stored productive suffixes 412 and a lexicon 414 of lemmas and derivational suffixes. The derivational generator 400 includes memory 413, in which the stored suffixes 412 and the lexicon may be stored. The memory 411 also serves to store the disambiguated corpus when received by the derivational generator 400, as well as intermediate values and outputs produced by the derivational generator 400.

Once the derivatives have been generated, they are filtered. The derivational analyzer also includes a dictionary 416, which may suitably be stored in the memory 411. The derivatives generated by the transducers 404–410 are checked against the dictionary 416. If a derivative exists in the dictionary 416, it is validated. If a derivative does not exist in the dictionary, it is checked against the disambiguated corpus 402. If the derivative exists in the corpus, it is validated as a good candidate for participating in the construction of a multiword morphological variant. If a word appears neither in the dictionary 416 nor in the disambiguated corpus 402, it is rejected. After all words and derivatives have been filtered, an expanded corpus 418 is produced as an output. The next step in producing the indexed corpus is to conflate term variants.

Figure 5:
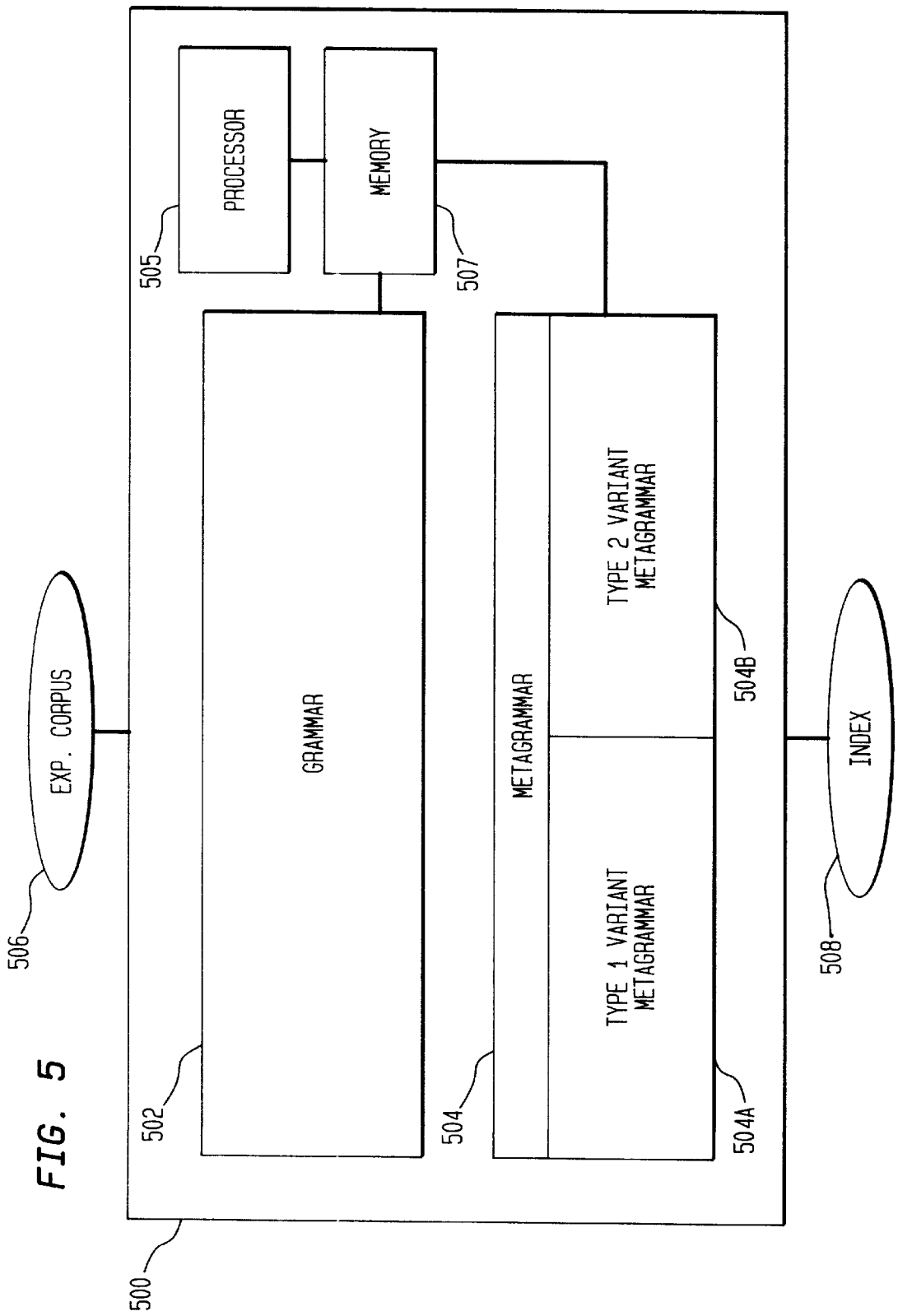
FIG. 5 illustrates a transformational analyzer according to the present invention.

FIG. 5 illustrates a transformational analyzer 500 according to the present invention. The transformational analyzer 500 employs linguistic knowledge to conflate term variants. The linguistic knowledge of the transformational analyzer 500 is divided into two databases, a grammar 502 and a metagrammar 504. The grammar 502 comprises a list of term rules. The skeleton of these rules represents the syntactic structure of the term, generally a noun phrase. The syntactic rules of the grammar 502 require certain agreements of, and impose certain restrictions on morphological features of the words of a term or the co-occurring words in the corpus. For example, the grammar 502 contains the rule that in a noun phrase the noun and the adjective must agree in gender and number. The feature 'lexicalization' is a link between the grammar 502 and the single words for a bottom-up filtering during parsing. This assures efficient access to the grammar 502 through the words encountered in the corpus.

The metagrammar comprises a list of metarules. Each metarule describes a class of term variations for terms with a specific structure. The metagrammar 504 is used for transforming the complex terms of the lexicon through morphosyntactic transformations including all the content words of the original term or one of their derivatives. The filtering of correct variants results from the exploitation of multiword terms, derivatives of single words, and specific syntactic patterns with slots for derivational links.

The metagrammar 504 is preferably divided into a first section 504A and a second section 504B. The first section 504A includes a metagrammar for type 1 variants, and the second section 504B includes a metagrammar for type 2 variants.

Type 1 variants are syntactic transformations of controlled terms which modify their syntactic structures but which do not involve any derivational change. In order to retrieve these variants, the first section 504A includes a metagrammar for filtering the structures which are expected to be correct modifications.

The structure of a multiword type 1 variant is a syntactic transformation of a controlled term depending on the syntactic structure of the term. Each syntactic transformation is associated with a different family of type 1 variation.

The second section 504B includes a metagrammar for type 2 variants. In addition to syntactic transformations, type 2 variants have undergone morphological changes from the original term. Thus, the metagrammar for type 2 variants contained in the second section 504B includes metarules for analyzing syntactic changes and derivational links between morphologically transformed words. The transformational analyzer 500 includes a processor 505 for implementing the rules of the grammar and the metagrammar, and memory 507 for storing inputs, outputs and intermediate values produced by the transformational analyzer 500.

The transformational analyzer 500 receives as an input an expanded corpus 506. Each term of the expanded corpus 506 is operated on by the processor 505 under the control of the grammar 502 and the metagrammar 504 to conflate term variants and produce an index 508. The index 508 contains a set of valid term variants.

Figure 6:
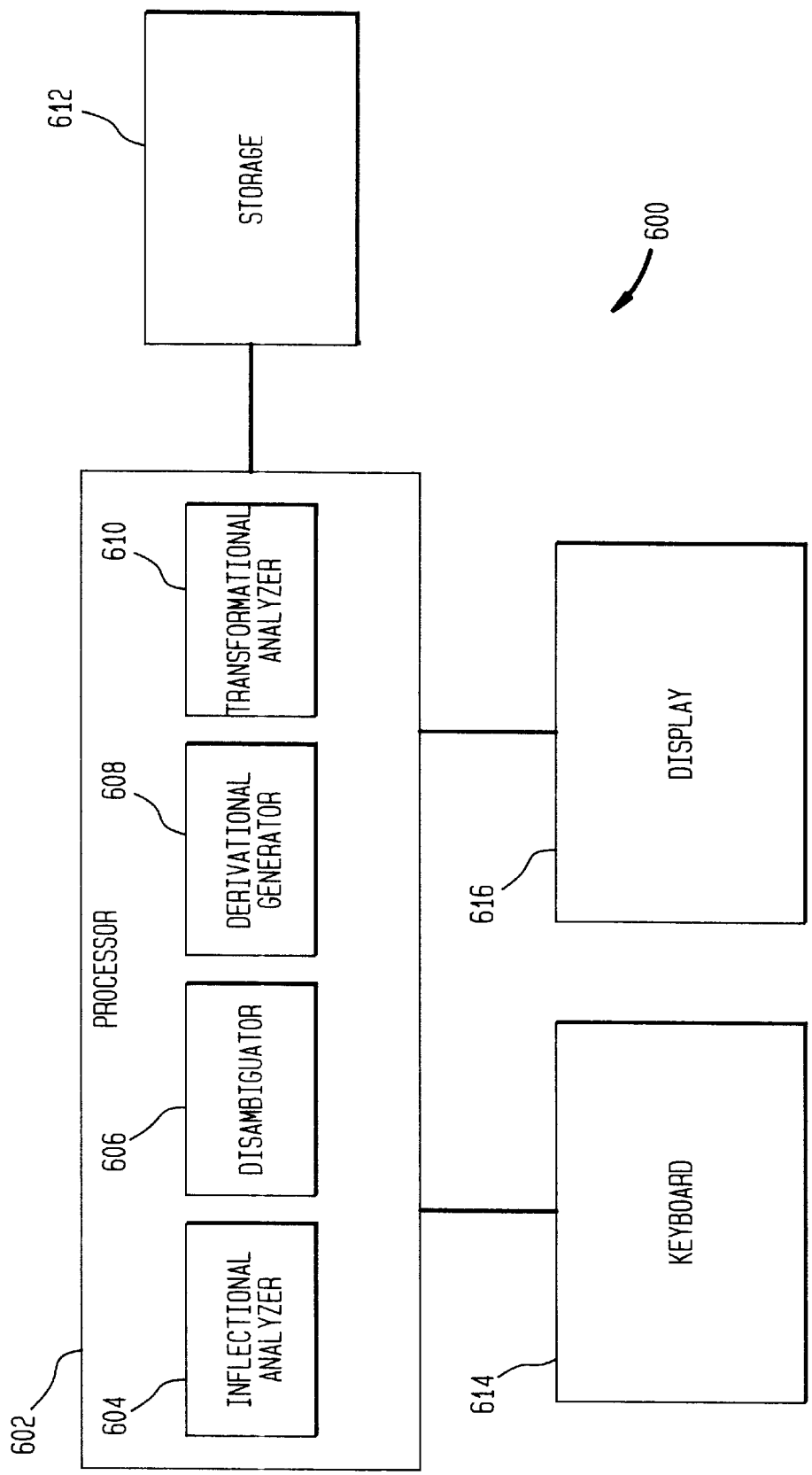
FIG. 6 illustrates a computer system suitable for implementing an index generator according to the present invention.

FIG. 6 illustrates a computer system 600 suitable for implementing an index generator according to the present invention. The computer 600 provides a processing unit 602 for implementing an inflectional analyzer 604, disambiguator 606, derivational generator 608 and transformational analyzer 610 similar to those illustrated in FIGS. 2–5. The inflectional analyzer 604, disambiguator 606, derivational generator 608 and transformational analyzer 610 can be suitably implemented through software instructions provided to and operated on by the processing unit 602. The computer 600 includes storage 612 for storing various inputs, outputs and intermediate results produced by the processing unit, and an input interface such as a keyboard 614 and an output interface such as a display 616 to provide operator access to the computer 600.

Figure 7:
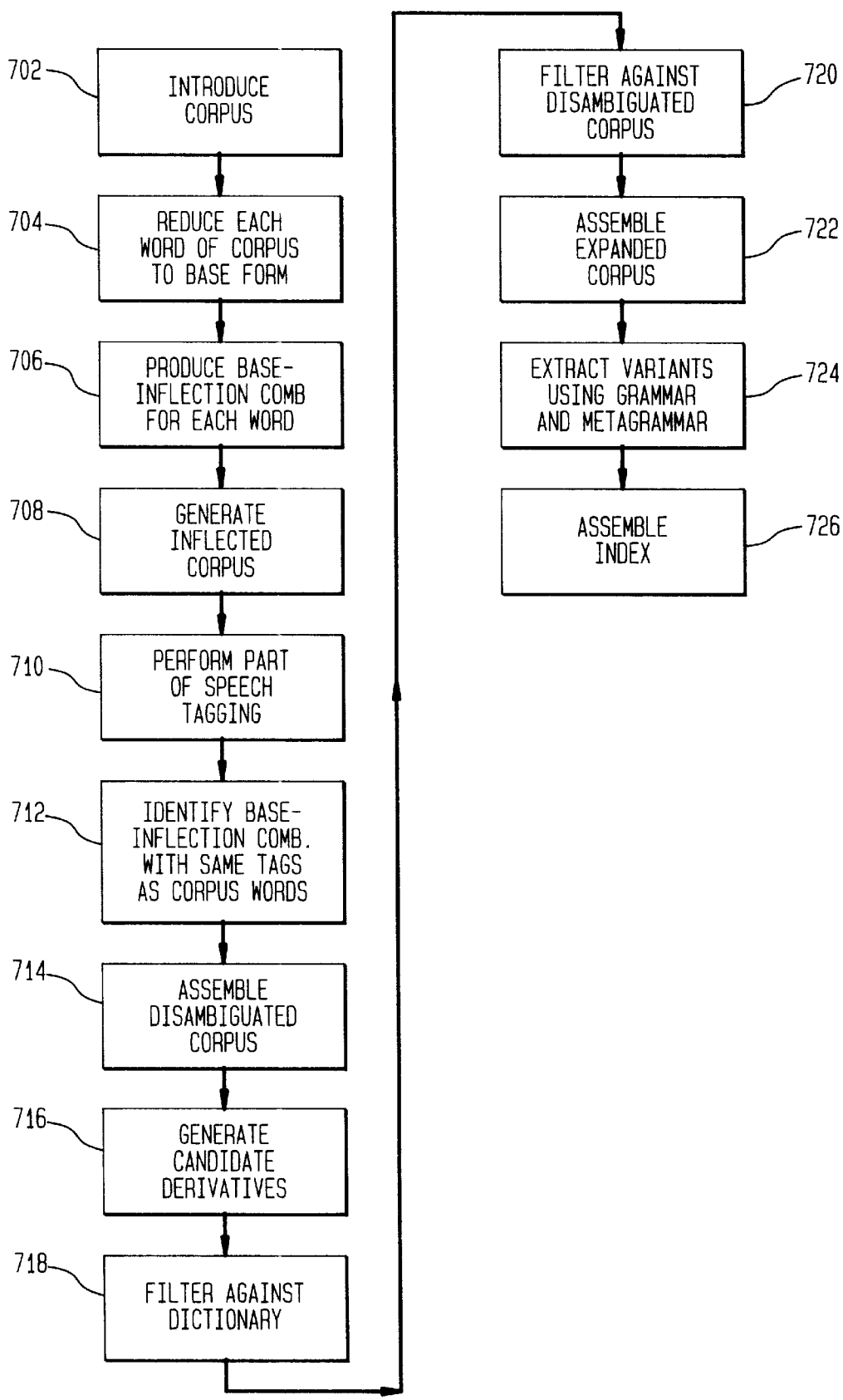
FIG. 7 is a flowchart illustrating a method of index generation according to the present invention.

FIG. 7 is a flowchart illustrating the steps of a method of index generation according to the present invention. At step 702 a corpus is introduced consisting of a plurality of documents, each document containing a plurality of words organized in standard grammatical fashion. At step 704 morpho-syntactic analysis is begun on the corpus to generate a complete set of inflectional relationships for each word in the corpus. Most words in a corpus are capable of being expressed as an inflection of a base form. For example, the French verb 'finir' (to finish) can be expressed as a combination of the base form, or stem, 'fin', combined with an appropriate inflectional affix. Thus, the infinitive form is 'fin'+'ir', the first person singular present indicative form is 'fin'+'is', the second person singular present indicative form is also 'fin'+'is', and the third person singular present indicative form is 'fin'+'it'. At step 704 each word of the corpus is reduced to a base form. Control is then passed to step 706, and each base form is combined with each inflection which could serve to generate the original word of the corpus. Thus the appearance of 'finit' may be associated with the combination 'fin'+'it'. Control is then passed to step 708 and a lemmatized corpus is generated showing the relationship between each word of the original corpus and all possible base-inflection combinations which could make up the word of the corpus. Control is then passed to step 710.

At step 710 disambiguation is begun on a lemmatized corpus. It is possible for a word of a lemmatized corpus to be related to more than one possible base-inflection combination. For example, 'finis' is related to both the first person singular indicative 'fin'+'is' and the second person singular indicative 'fin'+'is'. Disambiguation examines each word of the corpus to determine which base-inflection combination it derives from. At step 710 each base-inflection combination is tagged with its part of speech using linguistic knowledge and statistical analysis. Linguistic knowledge is stored in the form of negative constraints or negative rules. For example, if the phrase 'je finis' appears in the corpus it will be constrained by the rule that a second person singular verb cannot be preceded by a first person singular pronoun. Thus, the second person singular combination 'fin'+'is' is ruled out and the combination 'fin'+'is' associated with the phrase 'je finis' is tagged with a part of speech tag indicating a first person singular present indicative verb.

Statistical analysis is performed by operation on a restricted training corpus, which enhances the linguistic knowledge available for applying tags.

Control is next passed to step 712 and each word of a lemmatized corpus is identified with the base-inflection combination tagged with the same part of speech. Control is then passed to step 714 and a disambiguated corpus is assembled. Control is then passed to step 716 for derivational generation.

Derivational generation is the generation of every possible derivative of each word in the disambiguated corpus. At step 716, candidate derivatives are generated from stems, prefixes, derivational suffixes and inflectional suffixes. For example, the suffix 'ic' may be added to the English word 'organ' to produce the derivative 'organic'. The prefix 'in' may also be added to the derivative 'organic' to produce the further derivative 'inorganic'. Alternatively, the prefix 'un' may be added to the derivative 'organic' to produce the further derivative 'unorganic'. Control is then passed to step 718 and the candidate derivatives are compared to a dictionary. Each candidate which does not appear in the dictionary is compared against the disambiguated corpus. Each candidate which does appear in the dictionary is added to an expanded corpus. Each candidate compared against the disambiguated corpus which matches a word in the disambiguated corpus is also added to the expanded corpus. Candidates with match neither the dictionary nor the disambiguated corpus are discarded. For example, the candidate derivative 'unorganic' discussed above would appear neither in the dictionary nor in the disambiguated corpus and would be discarded.

Control is next passed to step 722 and the expanded corpus is produced. Control is then passed to step 724 for transformational analysis.

At step 724, variants are extracted from the expanded corpus using a grammar of multiword term rules and a metagrammar of metarules. The skeleton of the term rules represent the syntactic structure of the term, generally a noun phrase. The feature structures associated with the nodes of the syntactic structure, also called the 'domain of information', indicate that in a noun phrase, the noun and the adjective must agree in gender and number. The feature 'lexicalization' is a link between the grammar and the single words for a bottom-up filtering during parsing. This allows efficient access to the grammar through the words encountered in the corpus. The following is an example of the implementation of a grammar rule:

Rule $N_1 \rightarrow N_2 A_3$:
    <$N_1$ lexicalization>=$N_2$
    <$N_1$ label>='11462'
    <$N_2$ lemma>='production'
    <$N_2$ reference>=65135
    <$A_3$ lemma>='industriel'
    <$A_3$ reference>=37481
    <$N_1$ agreement>=<$N_2$ agreement>=<$A_3$ agreement>

The nodes in the syntactic structure (N1, N2, and A3) are identified by a part of speech label (e.g. N for noun, A for adjective) and an index used for distinguishing them one from another. The feature structure corresponding to any node in the syntactic structure is calculated by considering all the logical equations whose path begins with the label. For example, the feature structure of the noun 'production' (label $N_2$) is given by the third, fourth and seventh equations. This feature structure describes the string of the lemma (third equation), its reference (fourth equation), and it constrains the noun to agree in gender and number with the adjective (seventh equation).

The metarules consist of type 1 variant metarules and type 2 variant metarules. Type 1 variant metarules extract syntactic transformations which have contributed to the generation of the variant. An example of a type 1 metarule is:

Metarule Coord($N_1 \rightarrow N_2 A_3$)
$= X_1 \rightarrow N_2 (CP?D?A?NA?)|(A\ C))A_3$ N stands for noun, A for adjective, C for coordinating conjunction, D for determiner. The '?' superscript indicates that an element is optional. The preceding metarule identifies the variant 'plante et extraits aromatiques' (aromatic extracts and plants) with the term 'plante aromatique' (aromatic plant).

Type 2 variant metarules extract syntactic and morphological transformations which have contributed to the generation of the variant. Derivational links must be accounted for in the case of type 2 variants. An example of a type 2 metarule is as follows:

Metarule AtoN($N_1 \rightarrow N_2 A_3$)
$= X_1 \rightarrow N_4 (PD?A?N_2$:
    <$N_4$ deriv ref>=<$A_3$ ref>

The above metarule identifies 'chimie des precipitations' (chemistry of precipitations) with the term 'precipitation chimique' (chemical precipitation). It can be seen that a morphological change from 'chimie' to 'chimique' must be accounted for in identifying the variant with the original term.

Once all type 1 and type 2 variants are extracted, control is then passed to step 726 and an index is assembled containing a minimum number of variants.

In addition to conflating terms for an index, it is also advantageous to use techniques according to the present invention for query expansion. A query consisting of one or more search terms can be expanded according to the teachings of the present invention, to yield a set of related terms, all of which can be used to match terms of an index or corpus. Query expansion helps to insure comprehensive coverage of an index or corpus by a query.

Figure 8:
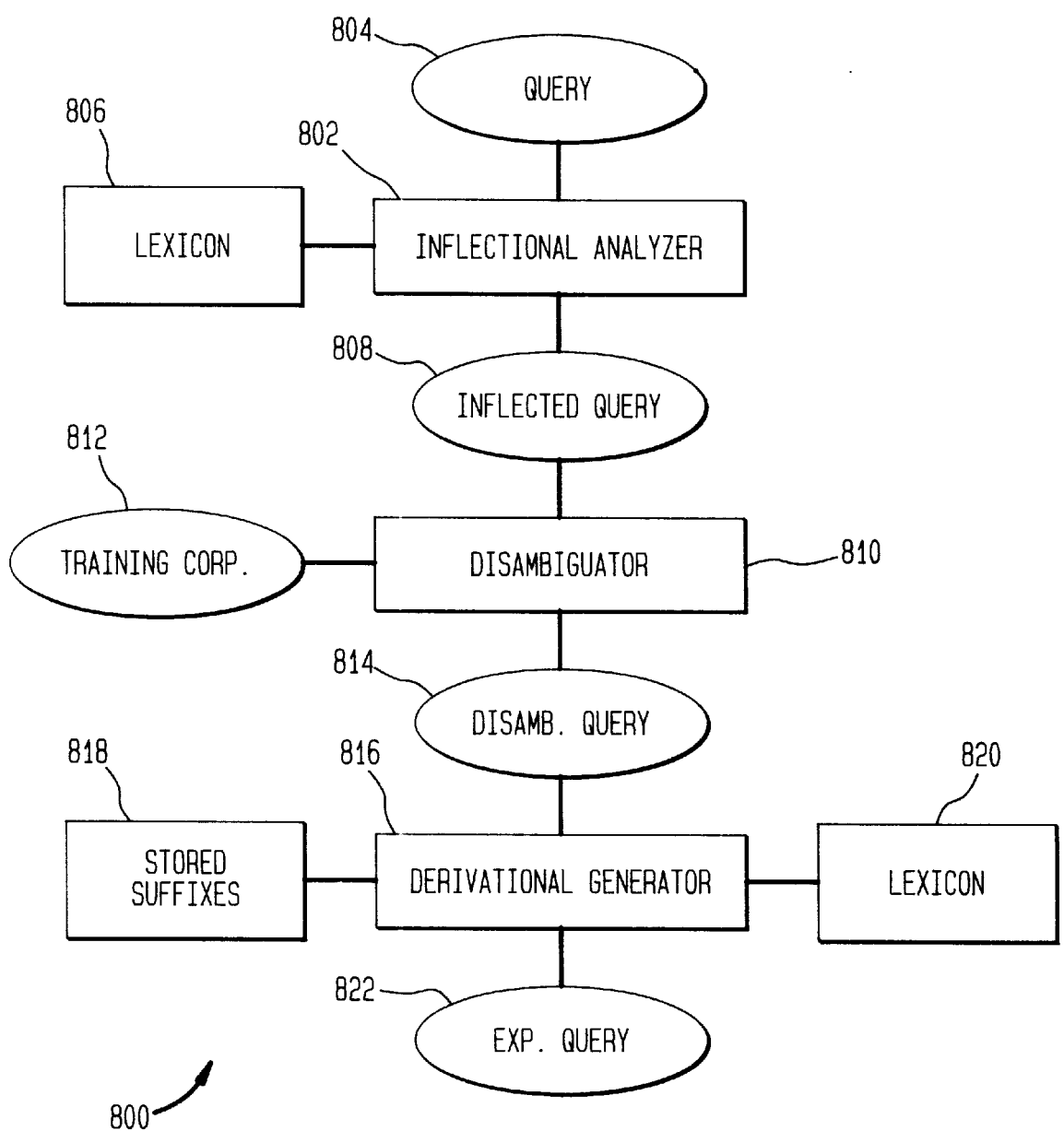
FIG. 8 illustrates a query expander in accordance with the present invention.

FIG. 8 illustrates a query expander 800 according to the present invention. The query expander 800 uses morpho-syntactic analysis to create an expanded query, analyzing the query using morphological and syntactic knowledge to create and expand the query.

The query expander 800 includes an inflectional analyzer 802. A query 804 is provided as an input to the inflectional analyzer 802. The output of the inflectional analyzer 802 is an inflected query 808 containing all possible lemmatizations.

An inflected query 808 is provided as an input to a part of speech disambiguator 810. The part of speech disambiguator 810 produces as an output a disambiguated query 812, the disambiguated query 812 having a disambiguated lemmatization. The disambiguated query 814 is provided as an input to a derivational generator 816, which also draws data from stored productive suffixes 818 and a stored lexicon of lemmas and derivational suffixes 820. The derivational generator 816 generates all the derivations of each disambiguated lemma, and produces as an output an expanded query 822 having derivational links. The expanded query contains all possible terms which could be created related to the original query. The expanded query is used to search the corpus or corpus index, with each term in the expanded query being used as a candidate match term against the corpus or corpus index.

The inflectional analyzer 802, disambiguator 810 and derivational generator 816 are similar to the inflectional analyzer 200, disambiguator 300 and derivational generator 400, respectively, and can be implemented and operated in a similar manner. The only modifications necessary are those necessary to receive queries as inputs and produce queries as outputs, and to process queries rather than corpora.

Figure 9:
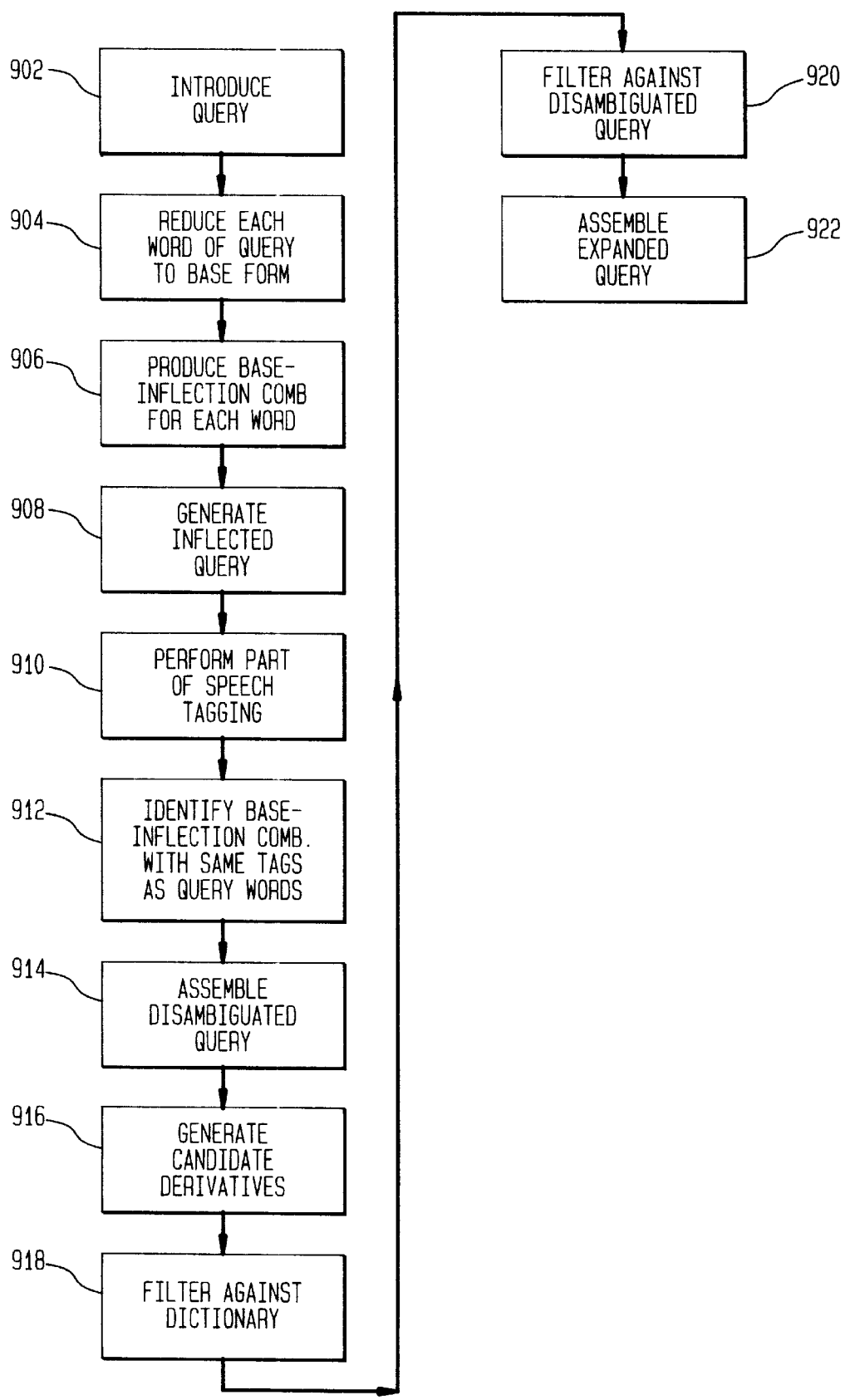
FIG. 9 illustrates a method of query expansion in accordance with the present invention.

FIG. 9 is a flowchart illustrating a method 900 of query expansion according to the present invention. At step 902, a query is introduced consisting of a single-word search term or a multiple-word search term. At step 904, morpho-syntactic analysis is begun on the query to generate a complete set of inflectional relationships for each word in the query. Each word in a query is capable of being expressed as an inflection of a base form. For example, the French verb 'finir' (to finish) can be expressed as a combination of the base form, or stem, 'fin', combined with an appropriate inflectional affix. Thus, the infinitive form is 'fin'+'ir', the first person singular present indicative form is 'fin'+'is', the second person singular present indicative form is also 'fin'+'is', and the third person singular present indicative form is 'fin'+'it'. At step 904, each word of the query is reduced to a base form. Control is then passed to step 906, and each base form is combined with each inflection which could serve to generate the original word of the query. Thus the appearance of 'finit' may be associated with the combination 'fin'+'it'. Control is then passed to step 908 and an inflected query is generated showing the relationship between each word of the original query and all possible base-inflection combinations which could make up the word of the query. Control is then passed to step 910.

At step 910, disambiguation is begun on the inflected query. It is possible for a word of the inflected query to be related to more than one possible base-inflection combination. For example, 'finis' is related to both the first person singular indicative 'fin'+'is' and the third person singular indicative 'fin'+'it'. Disambiguation examines each word of the query to determine which base-inflection combination it derives from. At step 910 each base-inflection combination is tagged with its part of speech using linguistic knowledge and statistical analysis. Linguistic knowledge is stored in the form of negative constraints or negative rules. For example, if the phrase 'je finis' appears in the query it will be constrained by the rule that a second person singular verb cannot be preceded by a first person singular pronoun. Thus, the second person singular combination 'fin'+'is' is ruled out and the combination 'fin'+'is' associated with the phrase 'je finis' is tagged with a part of speech tag indicating a first person singular present indicative verb.

Statistical analysis is performed by operation on a restricted training corpus, which enhances the linguistic knowledge available for applying tags.

Control is next passed to step 912 and each word of the inflected query is identified with the base-inflection combination tagged with the same part of speech. Control is then passed to step 914 and a disambiguated query is assembled. Control is then passed to step 916 for derivational generation.

Derivational generation is the generation of every possible derivative of each word in the disambiguated query. At step 916, candidate derivatives are generated from stems, prefixes, derivational suffixes and inflectional suffixes. For example, the suffix 'ic' may be added to the English word 'organ' to produce the derivative 'organic'. The prefix 'in' may also be added to the derivative 'organic' to produce the further derivative 'inorganic'. Alternatively, the prefix 'un' may be added to the derivative 'organic' to produce the further derivative 'unorganic'. Control is then passed to step 918 and the candidate derivatives are compared to a dictionary. Each candidate which does not appear in the dictionary is compared against the disambiguated query. Each candidate which does appear in the dictionary is added to an expanded query. Each candidate compared against the disambiguated query which matches a word in the disambiguated query is also added to the expanded query. Candidates which match neither the dictionary nor the disambiguated query are discarded. For example, the candidate derivative 'unorganic' discussed above would appear neither in the dictionary nor the disambiguated query and would be discarded. Control is next passed to step 922 and the expanded query is produced.

While the present invention is disclosed in the context of a presently preferred embodiment, it will be recognized that a wide variety of implementations may be employed by persons of ordinary skill in the art consistent with the above discussion and the claims which follow below. By way of example, while the present discussion is framed principally in the context of indexing, it will be recognized that the present techniques for generating morpho-syntactic variance can also be readily applied to extending a query to be searched. Further, while most of the specific examples relate to the French language, it will be recognized that the present invention is language independent and can be adapted to other languages utilizing an appropriate finite state transducer morphological processor, and an appropriate metagrammar.

We claim:

1. An index generator for generation of an index for information retrieval for a corpus, comprising:

an inflectional analyzer for receiving a corpus as an input, the inflectional analyzer producing a lemmatized corpus having an identified base form and associated inflection for each word of the corpus;

a disambiguator for receiving the lemmatized corpus as an input, the disambiguator applying syntactic knowledge to disambiguate identified multiple inflected base forms in the lemmatized corpus representing the same word in the original corpus to produce a disambiguated corpus;

a derivational generator for receiving the disambiguated corpus as an input and produce an expanded corpus including all possible derivations for each word in the disambiguated corpus; and a transformational analyzer for receiving the expanded corpus as an input and applying a grammar and a metagrammar to the expanded corpus to conflate term variants in the expanded corpus, the transformational analyzer producing an index to the corpus, the index having a minimum number of variants.

2. The index generator of claim 1, wherein the inflectional analyzer includes a finite-state morphological transducer and a lexicon containing all possible transitions between base and inflected forms, the morphological transducer employing morphological information contained in the lexicon to analyze the corpus in producing the lemmatized corpus.

3. The index generator of claim 2, wherein the disambiguator includes a part of speech tagger to tag each word in the lemmatized corpus with its part of speech.

4. The index generator of claim 3, wherein the disambiguator further includes a linguistic knowledge base to provide linguistic knowledge to the tagger to determine which tag to apply to a word of the lemmatized corpus.

5. The index generator of claim 4, wherein the disambiguator further includes a statistical knowledge base to supply statistically determined part of speech information to the tagger for use by the tagger in determining which tag to apply.

6. The index generator of claim 5, wherein the statistical knowledge base is generated by operation on a restricted training corpus to generate statistical knowledge about the words of the corpus for storage in the statistical knowledge base.

7. The index generator of claim 6, wherein the derivational generator includes a set of transducers for producing derivatives of each word of the disambiguated corpus.

8. The index generator of claim 7, wherein the set of transducers includes a prefix transducer, a stem transducer, a derivational suffix transducer, and an inflectional suffix transducer.

9. The index generator of claim 8, wherein the derivational generator also includes a database of stored productive suffixes.

10. The index generator of claim 9, wherein the derivational generator also includes a list of lemmas and derivational suffixes.

11. The index generator of claim 10, wherein the derivational generator also includes a dictionary against which the derivatives produced by the set of transducers are filtered, the derivational generator accepting derivatives appearing in the dictionary.

12. The index generator of claim 11, wherein the derivational generator filters derivatives not appearing in the dictionary against the disambiguated corpus, the derivational generator accepting derivatives appearing in the disambiguated corpus.

13. The index generator of claim 12, wherein the metagrammar includes a first section for analyzing type 1 variants and a second section for analyzing type 2 variants.

14. The index generator of claim 13, wherein the first section analyzes syntactic variations between original terms and variants.

15. The index generator of claim 14, wherein the second section analyzes syntactic and morphological variations between original terms and variants.

16. A method for generating an index for information retrieval from a corpus, comprising the steps of:

performing inflectional analysis on the corpus to identify all associated combinations of base form and inflection for each word of the corpus to produce a lemmatized corpus showing relationships between each word of the corpus and associated combinations of base forms and inflections;

performing disambiguation on the lemmatized corpus applying syntactic knowledge to disambiguate identified multiple inflected base forms in the lemmatized corpus representing the same word in the original corpus to produce a disambiguated corpus;

performing derivational generation on the disambiguated corpus to produce an expanded corpus containing all derivatives which can be produced from each combination of base form and inflection in the lemmatized corpus; and performing transformational analysis on the expanded corpus using a grammar and a metagrammar to extract variants of terms in the expanded corpus, producing an index with a minimum of term variants.

17. The method of claim 16 wherein the step of inflectional analysis includes morphological analysis to determine relationships between base and inflected forms.

18. The method of claim 17 wherein the step of disambiguation includes tagging each combination of base form and inflection to indicate its part of speech and performing syntactic analysis to identify the combination of base form and inflection having the same part of speech as the corresponding word in the lemmatized corpus.

19. The method of claim 18, wherein the step of derivational generation further includes filtering candidate words against a dictionary and placing in the expanded corpus candidate words which appear in the dictionary.

20. The method of claim 19, wherein the step of derivational generation further includes filtering candidate words which do not appear in the dictionary against the disambiguated corpus, and placing in the expanded corpus candidate words which appear in the disambiguated corpus.

21. The method of claim 20, wherein the metagrammar includes type 1 variant metarules extract syntactic transformations which have contributed to the generation of the variant and type 2 variant metarules extract syntactic and morphological transformations which have contributed to the generation of the variant.

22. A query expander for expansion of a query for information retrieval from a corpus, comprising:

an inflectional analyzer for receiving a query as an input, the inflectional analyzer producing an inflected query having an identified base form and associated inflection for each word of the query;

a disambiguator for receiving the inflected query as an input, the disambiguator applying syntactic knowledge to disambiguate identified multiple inflected base forms in the inflected query representing the same word in the original query to produce a disambiguated query; and a derivational generator for receiving the disambiguated query as an input and producing an expanded query including all possible derivations for each word in the disambiguated query.

23. The query expander of claim 22, wherein the inflectional analyzer includes a finite-state morphological transducer and a lexicon containing all possible transitions between base and inflected forms, the morphological transducer employing morphological information contained in the lexicon to analyze the query in producing the inflected query.

24. The query expander of claim 23, wherein the disambiguator includes a part of speech tagger to tag each word in the inflected query with its part of speech.

25. The query expander of claim 24, wherein the disambiguator further includes a linguistic knowledge base to provide linguistic knowledge to the tagger to determine which tag to apply to a word of the inflected query.

26. The query expander of claim 25, wherein the disambiguator further includes a statistical knowledge base to supply statistically determined part of speech information to the tagger for use by the tagger in determining which tag to apply.

27. The query expander of claim 26, wherein the statistical knowledge base is generated by operation on a restricted training corpus to generate statistical knowledge about the words of the training corpus for storage in the statistical knowledge base.

28. The query expander of claim 27, wherein the derivational generator includes a set of transducers for producing derivatives of each word of the disambiguated query.

29. The query expander of claim 28, wherein the set of transducers includes a prefix transducer, a stem transducer, a derivational suffix transducer, and an inflectional suffix transducer.

30. The query expander of claim 29, wherein the derivational generator also includes a database of stored productive suffixes.

31. The query expander of claim 30, wherein the derivational generator also includes a list of lemmas and derivational suffixes.

32. The query expander of claim 31, wherein the derivational generator also includes a dictionary against which the derivatives produced by the set of transducers are filtered, the derivational generator accepting derivatives appearing in the dictionary.

33. The query expander of claim 32, wherein the derivational generator filters derivatives not appearing in the dictionary against the disambiguated query, the derivational generator accepting derivatives appearing in the disambiguated query.

34. A method for expanding a query for use in information retrieval from a corpus, comprising the steps of:

performing inflectional analysis on the query to identify all associated combinations of base form and inflection for each word of the query to produce an inflected query showing relationships between each word of the query and associated combinations of base forms and inflections;

performing disambiguation on the inflected query applying syntactic knowledge to disambiguate identified multiple inflected base forms in the inflected query representing the same word in the original query to produce a disambiguated query; and performing derivational generation on the disambiguated query to produce an expanded query containing all derivatives which can be produced from each combination of base form and inflection in the inflected query.

35. The method of claim 34 wherein the step of inflectional analysis includes morphological analysis to determine relationships between base and inflected forms.

36. The method of claim 35 wherein the step of disambiguation includes tagging each combination of base form and inflection to indicate its part of speech and performing syntactic analysis to identify the combination of base form and inflection having the same part of speech as the corresponding word in the inflected query.

37. The method of claim 36, wherein the step of derivational generation further includes filtering candidate words against a dictionary and placing in the expanded query candidate words which appear in the dictionary.

38. The method of claim 37, wherein the step of derivational generation further includes filtering candidate words which do not appear in the dictionary against the disambiguated query, and placing in the expanded query candidate words which appear in the disambiguated query.

* * * * *